US 9,410,538 B2

(12) United States Patent
Barsacq et al.

(10) Patent No.: US 9,410,538 B2
(45) Date of Patent: Aug. 9, 2016

(54) ENERGY RECOVERING DEVICE (71) Applicant: GEPS INNOV, Saint-Nazaire (FR)

(72) Inventors: Mathieu Barsacq, Saint-nazaire (FR); Jean-Luc Longeroche, Saint-nazaire (FR); Philippe Magaldi, Saint-nazaire (FR)

(73) Assignee: GEPS INNOV, Saint-Nazaire (FR)

( * ) Notice: Subject to any disclaimer, the term of this patent is extended or adjusted under 35 U.S.C. 154(b) by 130 days.

(21) Appl. No.: 14/396,517

(22) PCT Filed: Apr. 24, 2013

(86) PCT No.: PCT/FR2013/050915
§ 371 (c)(1),
(2) Date: Feb. 4, 2015

(87) PCT Pub. No.: WO2013/160617
PCT Pub. Date: Oct. 31, 2013

(65) Prior Publication Data
US 2015/0167649 A1    Jun. 18, 2015

(30) Foreign Application Priority Data
Apr. 25, 2012    (FR) ...................................... 12 53803

(51) Int. Cl.
| | |
|---|---|
| *F01D 15/10* | (2006.01) |
| *F02C 6/00* | (2006.01) |
| *H02K 7/18* | (2006.01) |
| *H02P 9/04* | (2006.01) |
| *F03G 7/08* | (2006.01) |

(Continued)

(52) U.S. Cl.
CPC . *F03G 7/08* (2013.01); *F03B 13/00* (2013.01); *F03B 13/14* (2013.01); *F03B 13/16* (2013.01); *F03B 13/22* (2013.01); *F05B 2250/131* (2013.01); *Y02E 10/38* (2013.01)

(58) Field of Classification Search
USPC ................................................ 290/42, 52, 53
See application file for complete search history.

(56) References Cited

U.S. PATENT DOCUMENTS

| | | | | |
|---|---|---|---|---|
| 3,064,137 A | * | 11/1962 | Corbett, Jr. ........... | F03B 13/142 290/42 |
| 3,231,749 A | * | 1/1966 | Hinck, III ............... | F03B 13/20 290/53 |

(Continued)

FOREIGN PATENT DOCUMENTS

| | | |
|---|---|---|
| EP | 0 059 652 | 9/1982 |
| EP | 0 565 805 | 10/1993 |

(Continued)

OTHER PUBLICATIONS

PCT/FR2013/050915 International Search Report dated Nov. 21, 2013 (6 pages including English translation).

*Primary Examiner* — Pedro J Cuevas
(74) *Attorney, Agent, or Firm* — Brinks Gilson & Lione; G. Peter Nichols (57) ABSTRACT

An energy recovery device including a central compartment in which a turbine is arranged and which is positioned between at least first and second compartments is described. Liquid flows between the compartments via side valve systems and a central throttling channel. One specific feature is that an adjustable stopper is arranged substantially at the throttling channel. The device may include a second turbine that controls head losses and makes it possible to feed the main turbine located above, in the vortex.

11 Claims, 10 Drawing Sheets

(51) Int. Cl.
  *F03B 13/14* (2006.01)
  *F03B 13/16* (2006.01)
  *F03B 13/22* (2006.01)
  *F03B 13/00* (2006.01)
  *F03B 13/10* (2006.01)
  *F03B 13/12* (2006.01)

(56) References Cited

U.S. PATENT DOCUMENTS

| | | | | |
|---|---|---|---|---|
| 3,870,893 A * | 3/1975 | Mattera | F03B 13/183 | 290/42 |
| 3,912,938 A * | 10/1975 | Filipenco | F03B 13/183 | 290/42 |
| 3,922,739 A * | 12/1975 | Babintsev | B63B 51/02 | 290/42 |
| 3,970,415 A * | 7/1976 | Widecrantz | F03B 13/1815 | 290/42 |
| 4,009,396 A * | 2/1977 | Mattera | F03B 13/1805 | 290/42 |
| 4,110,630 A * | 8/1978 | Hendel | F03B 13/12 | 290/42 |
| 4,111,610 A * | 9/1978 | Brown | F03B 13/1815 | 290/53 |
| 4,117,676 A * | 10/1978 | Atencio | F03B 13/086 | 137/123 |
| 4,196,591 A * | 4/1980 | Wallace | F03B 13/1895 | 417/332 |
| 4,207,739 A | 6/1980 | Scarpi | | |
| 4,266,143 A * | 5/1981 | Ng | F03B 13/20 | 290/42 |
| 4,340,821 A * | 7/1982 | Slonim | F03B 13/187 | 290/53 |
| 4,392,061 A | 7/1983 | Dubois et al. | | |
| 4,423,334 A * | 12/1983 | Jacobi | F03B 13/20 | 290/42 |
| 4,438,343 A * | 3/1984 | Marken | F03B 13/20 | 290/53 |
| 4,851,704 A * | 7/1989 | Rubi | F03B 13/20 | 290/53 |
| 5,176,552 A * | 1/1993 | Kuboyama | B63B 22/166 | 290/42 |
| 5,186,822 A * | 2/1993 | Tzong | B01D 61/10 | 210/122 |
| 7,105,939 B2 * | 9/2006 | Bednyak | B60L 8/00 | 290/1 R |
| 7,239,038 B1 * | 7/2007 | Zimmerman | F03B 13/20 | 290/42 |
| 7,781,903 B2 * | 8/2010 | Buffard | F03B 13/187 | 290/42 |
| 7,989,975 B2 * | 8/2011 | Clement | F03B 13/20 | 290/53 |
| 8,110,935 B2 * | 2/2012 | Shin | F03B 13/1865 | 290/42 |
| 8,269,365 B2 * | 9/2012 | Clement | F03B 13/20 | 290/1 R |
| 8,487,459 B2 * | 7/2013 | Eder | F03B 13/186 | 290/42 |
| 8,614,521 B2 * | 12/2013 | Babarit | F03B 13/20 | 290/42 |
| 8,679,331 B2 * | 3/2014 | Bowers | E02B 1/003 | 210/170.11 |
| 8,685,254 B2 * | 4/2014 | Bowers | A01G 15/00 | 210/170.11 |
| 8,702,982 B2 * | 4/2014 | Bowers | A01G 15/00 | 210/170.11 |
| 8,715,496 B2 * | 5/2014 | Bowers | A01G 15/00 | 210/170.11 |
| 8,841,788 B2 * | 9/2014 | Sampaio | F03B 13/16 | 290/42 |
| 8,847,420 B2 * | 9/2014 | Garrido Garcia | F03B 13/20 | 290/53 |
| 2003/0137150 A1 * | 7/2003 | Shu | F03B 13/186 | 290/54 |
| 2004/0222637 A1 * | 11/2004 | Bednyak | B60L 8/00 | 290/1 R |
| 2004/0222638 A1 * | 11/2004 | Bednyak | B63J 3/04 | 290/1 R |
| 2005/0023836 A1 * | 2/2005 | Abdalla | F03B 17/025 | 290/44 |
| 2007/0138793 A1 * | 6/2007 | Zimmerman | F30B 13/20 | 290/1 R |
| 2007/0251230 A1 * | 11/2007 | Zimmerman | F03B 13/20 | 60/497 |
| 2008/0012344 A1 * | 1/2008 | Buffard | F03B 13/187 | 290/53 |
| 2009/0008942 A1 * | 1/2009 | Clement | F03B 13/20 | 290/53 |
| 2009/0224548 A1 * | 9/2009 | Oigarden | F03B 13/1855 | 290/53 |
| 2011/0089690 A1 * | 4/2011 | Babarit | F03B 13/20 | 290/42 |
| 2012/0126540 A1 * | 5/2012 | Healy | F03B 13/187 | 290/53 |
| 2013/0154267 A1 * | 6/2013 | Healy | F03B 13/24 | 290/53 |
| 2013/0234442 A1 * | 9/2013 | Garrido Garcia | F03B 13/20 | 290/54 |
| 2014/0312623 A1 * | 10/2014 | Anteau | F03B 17/005 | 290/52 |

FOREIGN PATENT DOCUMENTS

| | | |
|---|---|---|
| EP | 0 571 690 | 12/1993 |
| FR | 2 375 463 | 7/1978 |

* cited by examiner

ENERGY RECOVERING DEVICE

This application claims priority to International Application No. PCT/FR2013/050915 filed Apr. 24, 2013 and to French Application No. 1253803 filed Apr. 25, 2012, the entire contents of each are incorporated herein by reference.

BACKGROUND

The present invention relates, generally, to energy recovery from motion present on our planet, such as sea motion, seism, or the motion of movable objects.

SUMMARY

The French patent FR 2 375 463 has previously disclosed a device for recovering swell energy in the form of electrical energy. This device comprises a vessel:

comprising a plurality of peripheral compartments and a central compartment positioned between a first and a second of said peripheral compartments, having a vertical main axis at rest, and at least one side wall positioned between a plurality of peripheral compartments and the central compartment, suitable for oscillating about at least one axis perpendicular to said main axis under the effect of said motion, and containing a liquid which, when the vessel oscillates, flows between the first and second compartments via the central compartment, and containing at least one first turbine coupled with an AC generator.

Of the existing problems, note is made of the following:

the liquid moves from a compartment A to a compartment B and then from compartment B to compartment A; to obtain a satisfactory output, it is necessary to provide two turbines, i.e. one for each flow direction, these two turbines being suitable for being arranged in the same lower channel;

the installation of the device leads to a preference for a predominant swell propagation direction and reduces the output of the device once the direction of swell deviates from this predominant direction.

turbine output problems, associated with the head losses induced and control of the mass of liquid in circulation, in particular.

One aim of the present invention is that of proposing a device remedying all or some of the drawbacks mentioned above.

For this purpose, the present invention proposes that an adjustable stopper is arranged substantially at the throttling channel mentioned above in the intermediate partition arranged across the central compartment.

In this way, it will be possible to suitably control the level of the liquid mass in the central compartment and the negative pressure in the throttling channel, thus favouring suitable "feeding" of the turbine, including if it is arranged near the upper free surface of the central compartment.

According to one embodiment, it may be envisaged that the adjustable stopper comprises a secondary turbine.

This will then ensure (at least a substantial proportion of) the abovementioned head loss. It is recommended to couple said stopper with the main turbine, to thus feed same preferably continuously. Electronic control of the head thereof will be preferred.

In addition, or preferentially alternatively, it is envisaged that the adjustable stopper comprises a movable-wall diaphragm.

One solution for embodying this adjustable stopper, which may thus be in the form of a diaphragm, is that it is adjusted intrinsically, for example as a flexible and elastic membrane wherein the opening is deformed elastically according to the flow rate and the pressure applied thereon.

The reaction time for opening or closing the throttling channel may then be very rapid. Here again, coupling with the main turbine is recommended.

Although, with the device, and thus vessel, at rest, an installation with a first rotary turbine is envisaged, in the upper portion of the central compartment, about a central vertical axis, with, thereunder, a coaxial throttling channel, it is also envisaged, with an option of accounting for some operational specificities (sea with some specific swells or winds, etc.) that said channel and/or adjustable stopper is situated away from the axis of rotation of the first turbine.

This may be the case particularly if one or a plurality of (first) submerged turbines, of the marine turbine type, are arranged in the vortex current of said upper portion of the central compartment.

In a further aspect, the invention also relates to a method for recovering, in the form of electrical energy, energy from oscillation motion.

According to this method, the following steps are envisaged:

a vessel containing a liquid is provided with first and second compartments and a central compartment:

positioned between said compartments, between an upper portion and a lower portion whereof an intermediate partition provided with a channel forming a throttling zone for the flow of liquid from the upper portion to the lower portion is positioned, in the upper portion whereof at least one first turbine coupled with an AC generator is arranged, having at least one side wall where a first and a second valve system are arranged, such that some of said valves, situated, at rest, at a higher level of elevation than the other valves, move, during the oscillations, liquid from the first and second compartments to the upper portion of the central compartment, said further valves then moving liquid from the lower portion of the central compartment to the first and second compartments, under the effect of said motion, the vessel is oscillated about at least one axis perpendicular to a central axis of the vessel, vertical at rest, the liquid then flowing between the first and second compartments, via the central compartment:

where it rotates the turbine, and in the upper portion whereof a rotational motion of the liquid is created such that the particles of this liquid have different velocities in relation to each other, at different radial distances with respect to the abovementioned central axis.

In this way, a huge amount of energy available for the first turbine will be stored in the central compartment.

An eddy is created above the throttling channel, about the first turbine(s), moving the rotary rotor thereof, via the eddy flow. The associated generator, actuated in this way, in turn produces the electric current supplying the network. The efficiency of the/each turbine is dependent on the velocity of the liquid at the periphery thereof and submersion height of the blades thereof.

In order to promote or maintain the vorticity created about, and at the turbine in question, it is recommended to:

control in respect of opening/closing and/or flow rate, by means of a control loop, at least the "upper" valves moving liquid from the first and second compartments to the upper portion of the central compartment, and/or provide same with flaps directing, in the open position, the liquid flow so as to inject said flow into the central compartment with a velocity tangential to the corresponding side wall of the central compartment, with an angle with respect to the normal N to the side wall of at least 45°.

In the central compartment, the liquid will always flow from top to bottom, more particularly from the upper portion to the lower portion, regardless of the motion of the vessel. The turbine will thus always be actuated in the same direction regardless of the direction of liquid flow. This will enhance the output of the turbine by preventing acceleration and deceleration phases.

The upper portion of the central compartment, also called the central tank, forms a buffer tank suitable for containing a liquid reserve ensuring regular turbine rotation.

The volume of this upper portion is at least equal to at least equal to one third, preferably at least equal to half of the volume of the first or second compartment, more preferably at least equal to the volume of this first or second compartment, each thereof successively switching from an upstream (upper) to downstream (lower) situation, according to the oscillations.

The initial energy source is thus generated by the difference in water level between the upstream (upper) and downstream (lower) compartments.

The energy of the initial motion will be found in practice mostly (⅘) in the kinetic energy stored by the eddy generated in the central compartment.

The device may comprise a plurality of turbines, for example two turbines, arranged on the trajectory of the liquid flowing between said first and second compartments.

According to one specific aspect, the first valve system and the second valve system are each suitable for injecting the liquid into the upper portion of the central compartment so as to generate the abovementioned vorticity, in said upper portion, said central compartment being preferably equipped with at least one turbine having a vertical rotating axis, preferably substantially aligned with the main axis of the vessel.

The vertical rotating axis of the turbine is understood to be oriented according to Earth's gravity.

In this embodiment, the device recovers the potential energy from the liquid, resulting from a difference in water level between the first and second compartments, as described above, and the kinetic energy of (practically) the entire mass of liquid rotating in the central compartment. The rotational movement of the liquid mass contained in the upper portion of the central compartment or tanks results from the injection of water from the peripheral compartments by means of a difference in water level, the rotational motion of the liquid in the central compartment generated by the motion of the vessel, and the discharge of water via the throttling channel, with a difference in pressure between the central compartment and the peripheral compartments.

Test results demonstrate that the energy transmitted by the flow rate passing through the throttling channel corresponds to approximately ⅕ of the total energy recovered by the device, the larger portion of the energy transmitted, approximately ⅘, consists of the kinetic energy of the rotating liquid. In this way, a large portion of the kinetic energy of rotating liquid is obtained directly from the motion of the vessel. The vortex acts as a kind of "hydraulic inertia flap", wherein the motion and velocity are maintained by the motion of the vessel. The rotating motion of the liquid inside the central compartment is a huge energy reserve suitable for "flattening" the flow rate variations associated with water level delta variability. For this reason, the turbine is subject to less flow rate variations.

Advantageously, the terrestrial device is equipped with elastic return means arranged between the energy recovery device and said terrestrial device to maintain, if required, the motion of the energy recovery device.

The invention will be understood more clearly, and further aims, details, features and advantages will emerge more clearly in the course of the detailed explanatory description hereinafter, with reference hereinafter to the appended figures, wherein:

The invention will be described in the context of a swell energy recovery device without the possibility of there being any limitation of the scope of the invention to this type of energy. The device is applicable for recovering energy from anybody in motion. It is also applicable for recovering vibrational energy from seism.

The general principle of the device according to the invention consists of converting the kinetic energy of a solid in non-uniform rotational or oscillating motion into the potential energy of a liquid by converting the motion of the solid into a liquid level. This potential energy of the liquid is then converted, by a quasi-continuous flow on a turbine coupled with an AC generator, into electrical energy. This electrical energy is then transmitted to the electrical network or stored in a form suitable for subsequent use.

Figure 1:
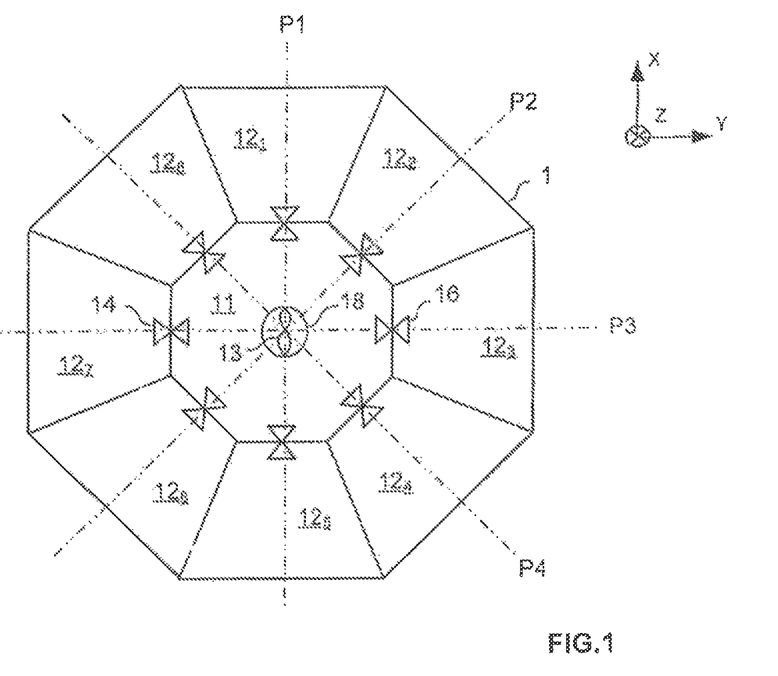
FIG. 1 is a schematic top view of a device according to a first embodiment of the invention, without said first turbine placed in the upper portion of the central compartment.
Figure 2:
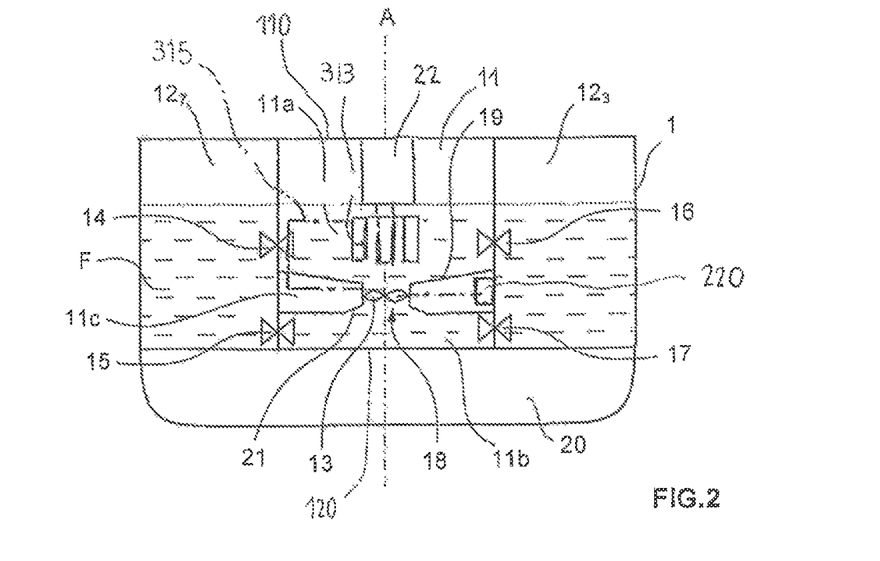
FIG. 2, is a schematic sectional view along a median plane of the device in FIG. 1.

A first envisaged embodiment is represented schematically in FIGS. 1 and 2.

With reference to these figures, the device comprises a vessel 1 comprising a central compartment 11 comprising a main axis A and eight peripheral compartments $12_1$ to $12_8$ all arranged about the central compartment. The peripheral compartments are arranged in pairs about the central compartment, both compartments of each pair being arranged symmetrically with respect to the main axis A. The vessel also comprises, in the lower part, an caisson 20 which is filled with air and water-tight acting as a float for keeping the vessel on the sea surface. The axis A is in this instance vertical, when the device is at rest.

The central compartment and the peripheral compartments contain liquid F. This liquid is suitable for flowing between the peripheral compartments via the central compartment when the vessel oscillates or pivots about at least one axis perpendicular to the axis A.

The central compartment and the peripheral compartments are closed to the outside: while they are interconnected, they are not connected with the outside. At sea, water does not enter therein as the waves pass.

The central compartment is separated between an upper portion 11*a* and a lower portion 11*b*, via a transverse intermediate partition or wall 11*c* where a throttling zone is defined.

A main turbine 313 is arranged in the upper portion 11*a* of the central compartment, preferably. This turbine is arranged on the trajectory of the liquid flowing between the peripheral compartments. It is coupled with an AC generator 22 (FIG. 2) to produce electrical energy when the turbine is actuated by the liquid flowing in the central compartment. In FIG. 2, but also FIGS. 6, 10, 12, this main turbine 313 is arranged on the free surface of the central compartment, enabling a high output.

Non-return valve systems are envisaged in the inner wall of the peripheral compartments, between these peripheral compartments and the central compartment. These non-return valves are referenced 14, 15, 16 and 17 for the peripheral compartments $12_7$ and $12_3$. The valves 14 and 16 are arranged at the upper portion, referenced 11*a*, of the central compartment 11 and the valves 15 and 17 are arranged at the lower portion, referenced 11*b*, of the central compartment.

The non-return valves 14 and 17 are envisaged respectively to allow liquid to flow from the compartment 127 to the central compartment 11 and from the central compartment 11 to the compartment 123. Conversely, the non-return valves 16 and 15 are provided for respectively allowing liquid to flow from the compartment 123 to the central compartment 11 and from the central compartment 11 to the compartment 127.

The turbine 313 is thus submerged, in an intermediate zone of the central compartment between the top 110 thereof (top of the upper portion 11*a* thereof) and the bottom 120 thereof (bottom of the lower portion 11*b* thereof), such that, when liquid flows from the upper portion to the lower portion under the effect of gravity, said liquid rotates said turbine.

The intermediate partition 11*c* has a channel 18 of reduced cross-section with respect to the (horizontal) cross-section of the portions 11*a* and 11*b*. In this way, this channel 18 defines a throttling zone for the flow of liquid from the upper portion 11*a* to the lower portion. It is in this instance coaxial with the axis of rotation of the turbine 313. This axis is in this instance aligned with the central axis A and is thus vertical, when the vessel is at rest, as in FIG. 2 for example.

Figure 3:
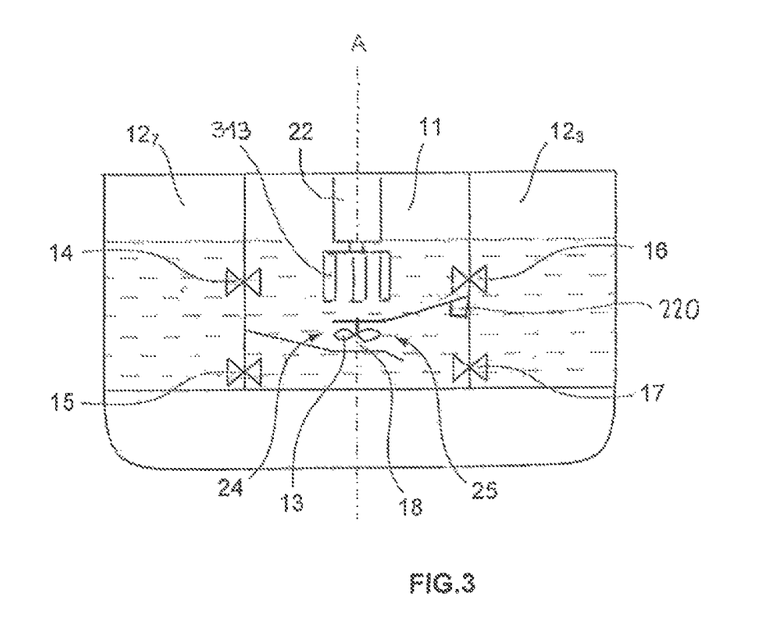
FIG. 3 is a sectional view along a median plane of a device according to one alternative embodiment of the first embodiment.
Figure 4A:
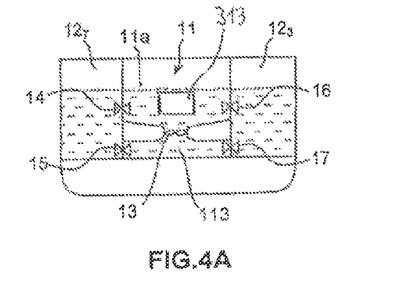
FIGS. 4A to 4H are views illustrating the operation of the device in FIGS. 1 and 2.
Figures 4B, 4F:
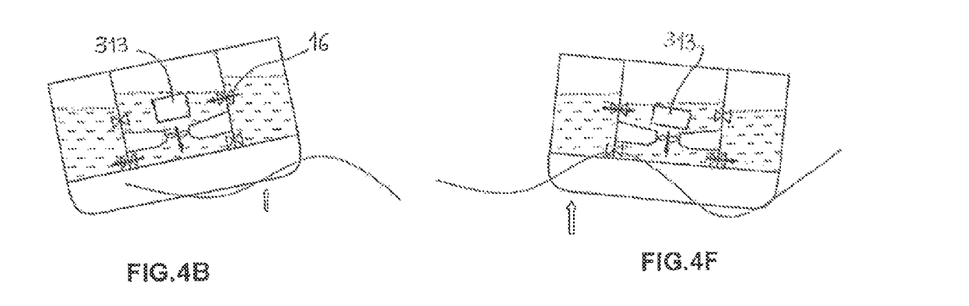
Figures 4C, 4G:
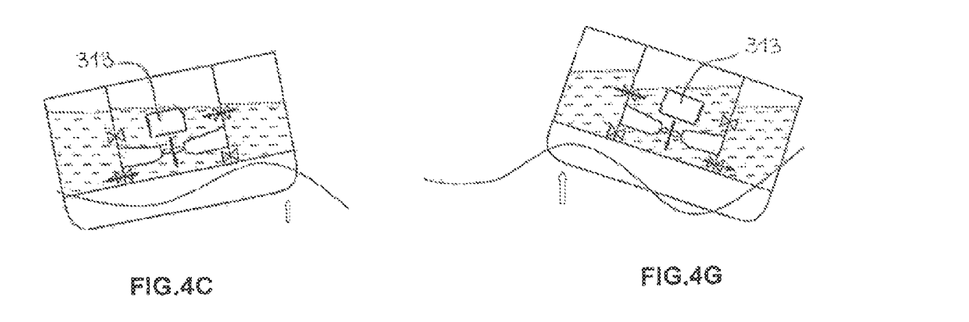
Figures 4D, 4H:
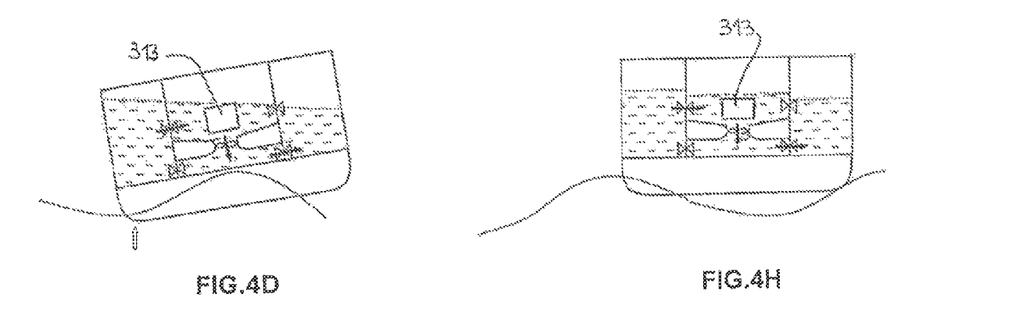
Figure 4E:
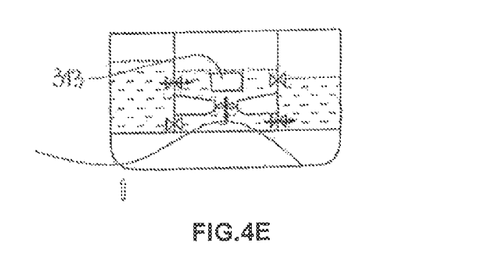

A secondary turbine 13 is arranged at the location of the channel 18. In FIG. 3, the axis of the secondary turbine 13 could, alternatively, be perpendicular to the axis A. The turbine would then be pivoted by 90° in relation to the diagram.

It is advised to couple the head variations controlling the main and secondary turbines electronically via the link 315. It is possible to envisage mechanical coupling of the two turbines via gearboxes.

The secondary turbine 13 is connected to an AC generator 220. This principle also applies for the other alternative embodiments in question.

By varying the rotational speed of this secondary turbine, adjustable closure of this channel may be obtained. The centred discharge, with this turbine wherein the head will be controlled electronically coupled with the main turbine, in this instance 313, will be suitable for feeding the latter continuously, by controlling the head loss. The axis of rotation of the secondary turbine 13 is in this case positioned on the axis A.

The central compartment is advantageously equipped, at the location of the intermediate partition 11*c*, with a converging member 19 arranged upstream from the channel 18 for directing the liquid from the upper portion 11*a* towards the channel 18. It also advantageously comprising a diverging member 21, arranged downstream from the channel 18, for the turbine output according to the principle of conservation of mass.

A diverging member 25 may be envisaged at the outlet of the channel, downstream from the turbine.

The operation of the device in FIGS. 1 and 2, when subject to the actions of the swell, is described with reference to FIGS. 4A to 4H. In these figures, the vessel 1 oscillates about an axis parallel with the swell propagation direction.

According to one preferred embodiment, the non-return valves 14 to 17 are controlled in respect of opening/closing and/or flow rate by a control loop to maintain continuous flow of the liquid between the upper portion 11*a* and the lower portion 11*b*. This enables the turbines to operate continuously in a speed and pressure range for which it was conceived. This control loop may also act on the turbine pitch in order to adapt to the flow rate of the liquid transferred between compartments.

The control loop acts on the degree of opening of the diaphragms of the non-return valves and eventually on the turbine pitch as a function of a plurality of input parameters including the following parameters:

the water levels in the various compartments, the angle of the vessel along the axis Ox (list) and/or the axis Oy (elevation) and/or the axis Oz (yaw);

the swell period and/or the rocking period and/or the pitching period;

the acceleration along the axes Ox, Oy and Oz;

the power captured by the turbine;

vessel stability parameters;

the instantaneous electrical power at the AC generator output;

the available power.

Figure 5:
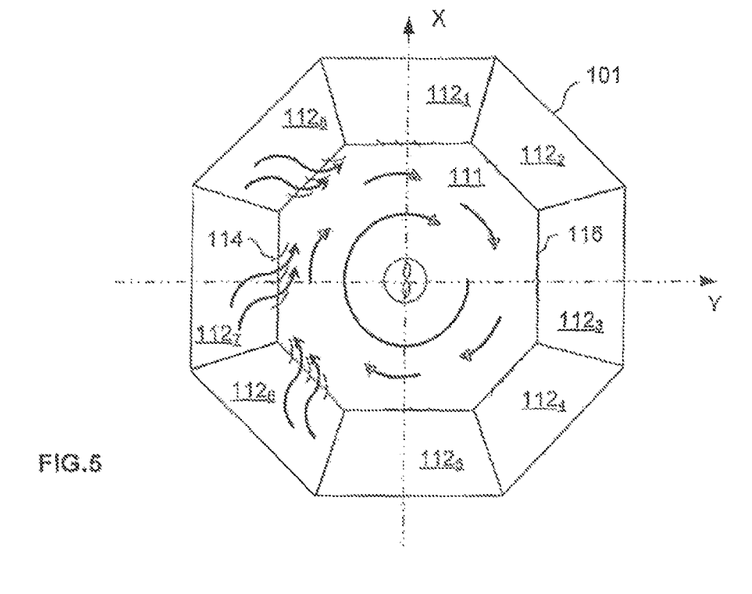
FIGS. 5 and 6 are respectively a top view (without said first turbine) and a schematic view along a vertical median plane of a device according to a second embodiment.
Figure 6:
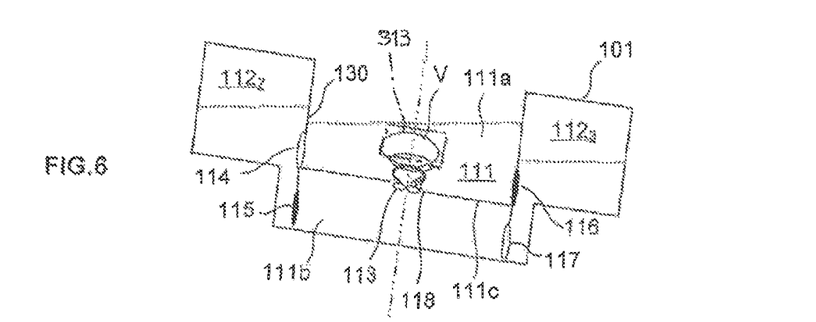

FIGS. 5 and 6 illustrate a device according to a second envisaged embodiment. The device comprises as above a vessel 101 comprising a central tank or compartment 111 having a main axis A, with four planes of symmetry, and eight peripheral tanks or compartments 1121 to 1128. The central compartment comprises an upper portion 111*a* and a lower portion 111*b*, defined by a horizontal intermediate wall 111*c*.

In the stable initial position thereof, the main axis A is vertical, the levels of liquid in the peripheral compartments and the central compartment are identical. The upper portion forms a buffer tank.

A secondary turbine 13, having a vertical rotational axis, is further arranged in the central compartment at a central discharge orifice or central conduit 118, the axis of rotation thereof being aligned with the main axis A. Above, it is provided again the main turbine 313 mounted as above (see FIG. 6).

For each pair of peripheral compartments, the valve systems mounted on the side wall 130 comprise, so-called injection valves 114, 116 for injecting the liquid from the peripheral compartments into the upper portion 111a of the central compartment, so as to generate and maintain a vortex V in said upper portion, and so-called lower valves 115, 117 for transferring the liquid from the lower portion 111b of the central compartment to the peripheral compartments.

Figure 7A:
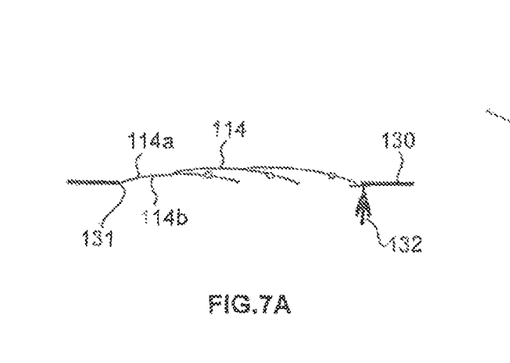
FIGS. 7A and 7B are schematic views of injection valves of the device in FIGS. 5 and 6, in the closed position and in the open position respectively.
Figure 7B:
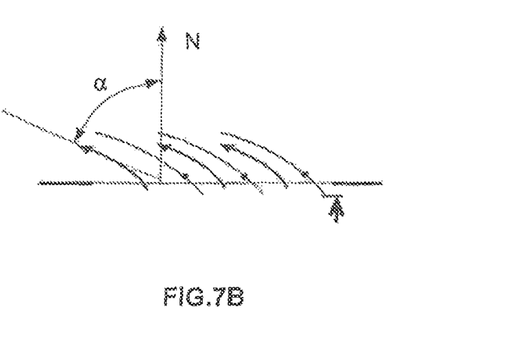
Figure 8A:
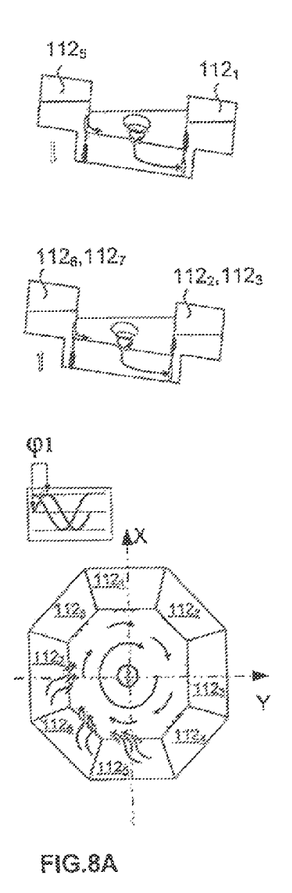
FIGS. 8A to 8D are schematic views illustrating the operation of the device in FIGS. 5 and 6 (without said first turbine)
Figure 8B:
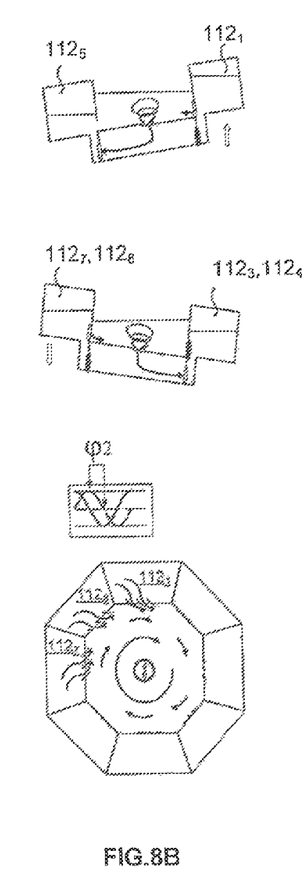
Figure 8C:
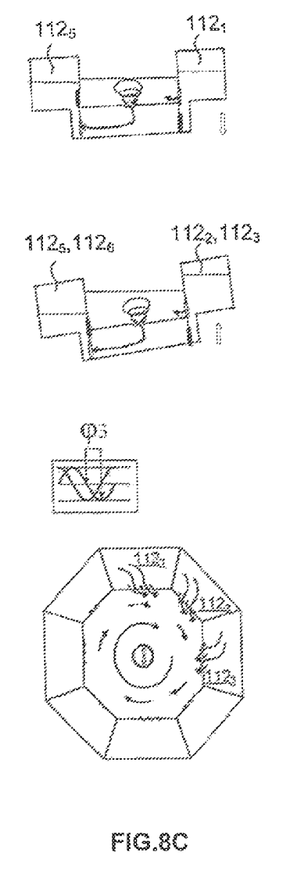
Figure 8D:
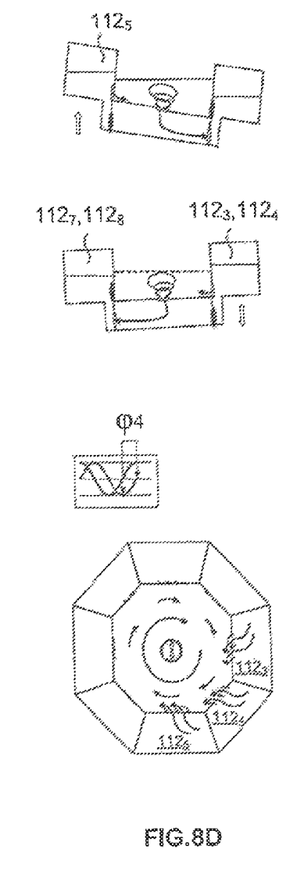

With reference to FIGS. 7A and 7B, each injection valve 114 comprises three flaps 114a each pivotally mounted about a vertical axis. The flaps each open and close the orifice in question between the peripheral compartment in question and the central compartment, as well as the direction of the liquid flow to generate and maintain the abovementioned vortex.

The lower valves 115, 117 consist of mere non-return valves mounted at an opening or pipe of the side wall of the lower portion.

FIGS. 8A to 8D illustrate various phases of a sinusoidal oscillation cycle having a period T, in the case of a cycle corresponding to a motion consisting of a rotation about the axis X and a rotation about the axis Y, having the same amplitude and same period, but phase-shifted by T/4. In this case, all peripheral compartments are used for liquid transfer. For the description, the compartment 1127 is considered to be on the left side of the vessel, the compartment 1123 is on the right side, the compartment 1121 is to the front of the vessel, and the compartment 1125 is to the rear of the vessel.

In order to increase quantity of energy recovered, the device is advantageously duplicated on a plurality of levels.

Figure 9:
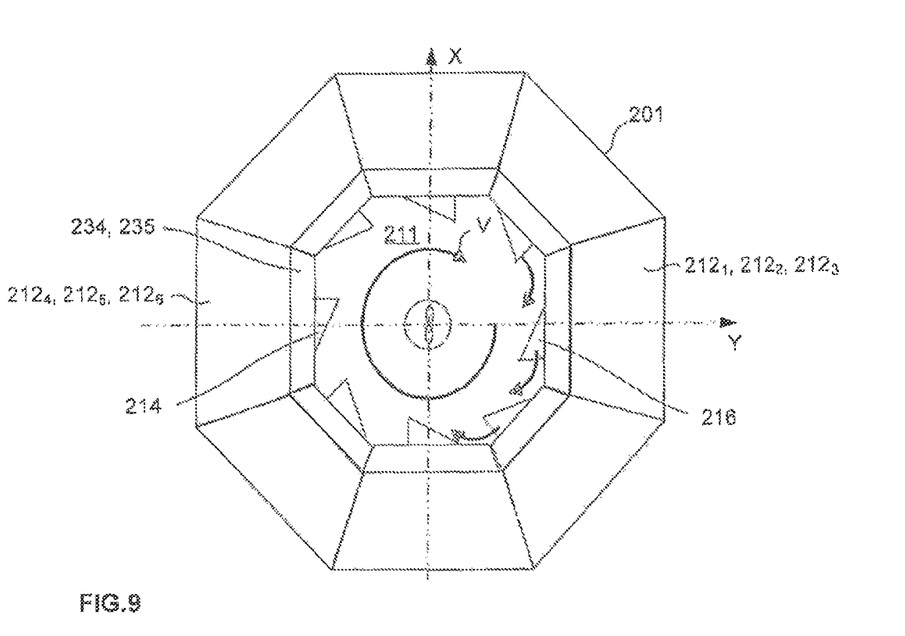
FIGS. 9 and 10 are respectively a top view (without said first turbine) and a schematic view along a vertical median plane of a device according to a third embodiment.
Figure 10:
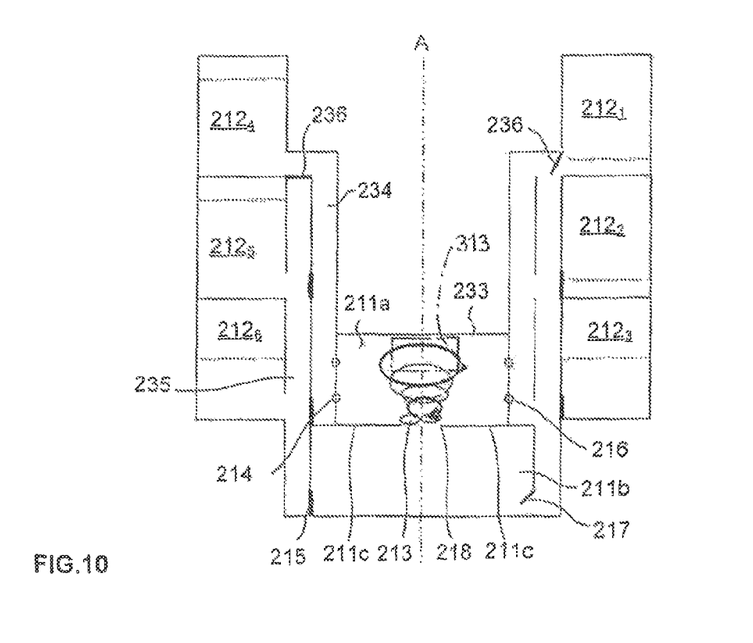
Figure 11A:
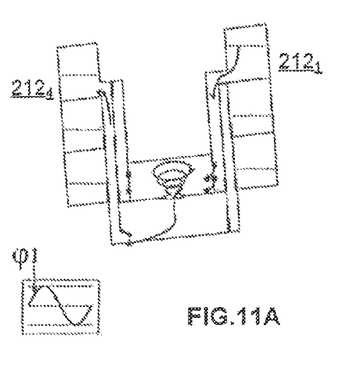
FIGS. 11A to 11F are schematic views (without said first turbine) illustrating the operation of the device in FIGS. 9 and 10.
Figure 11B:
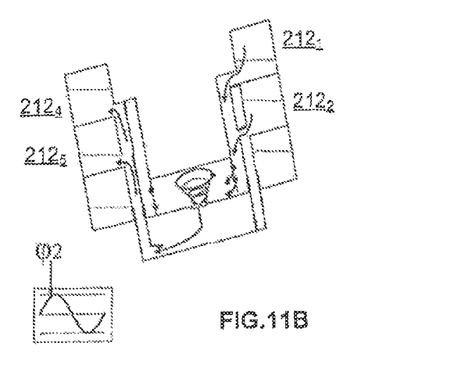
Figure 11C:
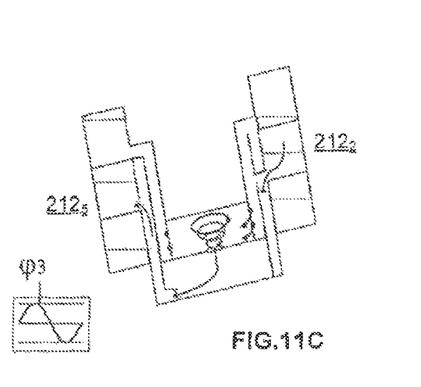
Figure 11D:
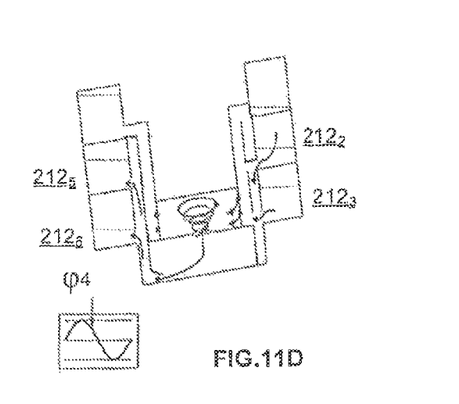
Figure 11E:
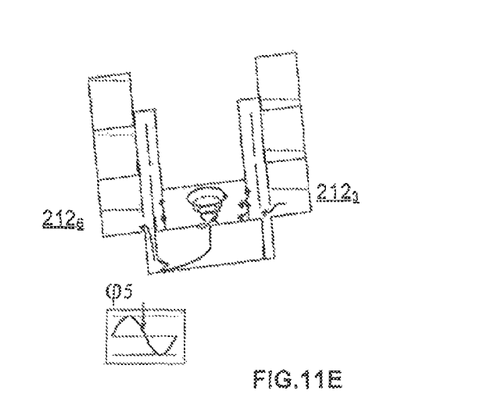
Figure 11F:
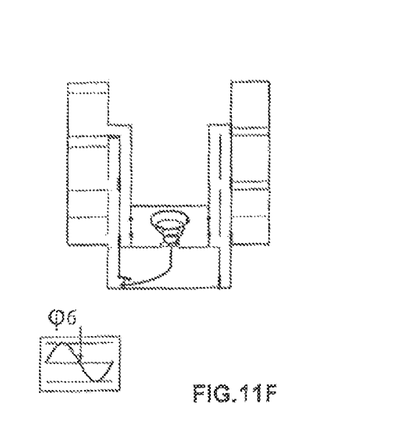

FIGS. 9 and 10 illustrate a device according to a third embodiment according to the invention comprising pairs of peripheral compartments vertically offset on three levels or stages. The device comprises as above a vessel 201 comprising a central vessel or compartment 211 having a main axis A, with four planes of symmetry, and three stages of eight peripheral vessels or compartments. On each stage, the peripheral compartments are arranged about the central compartment.

The central compartment comprises an upper portion 211a and a lower portion 211b, defined by an intermediate wall 211c. The upper portion 211a forms a buffer tank, wherein the volume is at least equal to the volume of each peripheral compartment. The intermediate wall has the central discharge orifice or central conduit 218, substantially at the level whereof a secondary turbine 213 forming a variable stopper is once again mounted. The axis of rotation thereof was chosen as vertical. Above, the main turbine 313 is once again found; see FIG. 10.

Each injection system 214, 216 forms a deflector fixedly mounted on the side wall, at an opening of the side wall, so as to create a rotational motion of the liquid in the clockwise direction, as illustrated in FIG. 9. The lower valves 215, 217 form non-return valves mounted at an opening of pipe of the side wall of the lower portion.

The three-way type valves and the lower valves are controlled in respect of opening and closing, according to the oscillation motion of the vessel.

In this embodiment, the central compartment is always full to enable the transfer of liquid between the lower, intermediate and upper peripheral compartments.

FIGS. 11A to 11F illustrate various phases of a sinusoidal oscillation cycle having a period T, in the case of a single cycle corresponding to a rotational motion about the axis X.

As shown in FIGS. 2, 6,10 in particular, the upper valves 14,16, 114,116, 214,216 supplying liquid into the central compartment may be situated laterally at (in elevation) the main turbine 313, or even lower (FIG. 6, 10).

Figure 12:
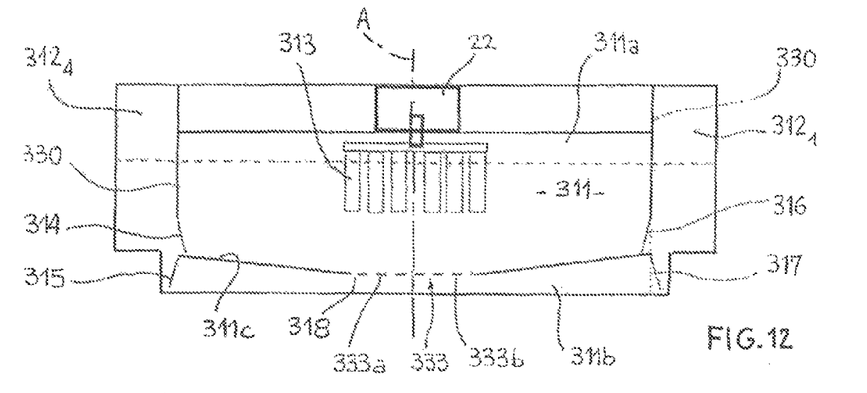
FIG. 12 illustrates a further alternative embodiment along a vertical section, also schematic, FIGS. 13 and 14 further illustrate a further alternative embodiment, along vertical and horizontal sections respectively (arrows XIV-XIV), again schematic.

In the version in FIG. 12, the first turbine 313 coupled with an AC generator 22 is arranged in the upper portion of the central compartment 311, in an intermediate zone thereof.

At a lower level, the channel 318 again defines, in the transverse partition 311c, the throttling zone of the flow of liquid from the upper portion 311a of the compartment 311 to the lower portion 311b thereof.

Laterally, the (at least two) peripheral compartments (in this case both are shown: 3121, 3124) are connected to the central compartment, via the valve system 314-317 which, mounted at two different elevation levels at the location of the side wall 330 interconnect, as explained above, the central 311 and side compartments 3121, 3124 respectively (at least).

This features an operating mode already explained in relation to the previous figures. However, a significant difference with these solutions lies in the embodiment, substantially at the location of the throttling channel 318, of the adjustable stopper 333 as a movable-wall diaphragm such as 333a,333b.

By actuating, for example via motorization, these movable walls, it will be possible (in another manner to that described above) to vary the cross-section of this throttling 318 and thus adapt the head loss and the liquid level in 311a, so that the turbine 313 is preferably completely submerged all the time.

Figure 13:
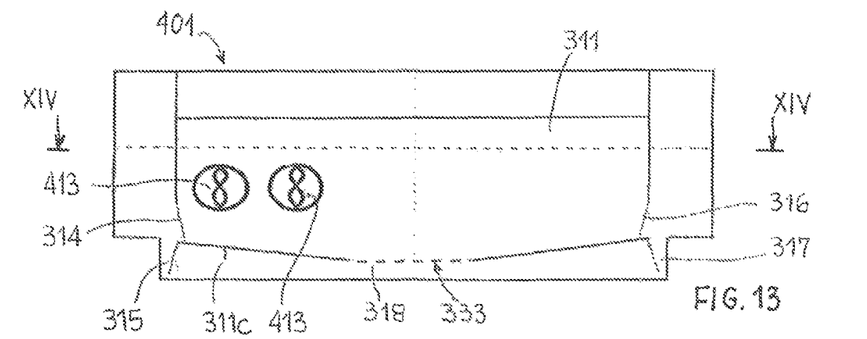
Figure 14:
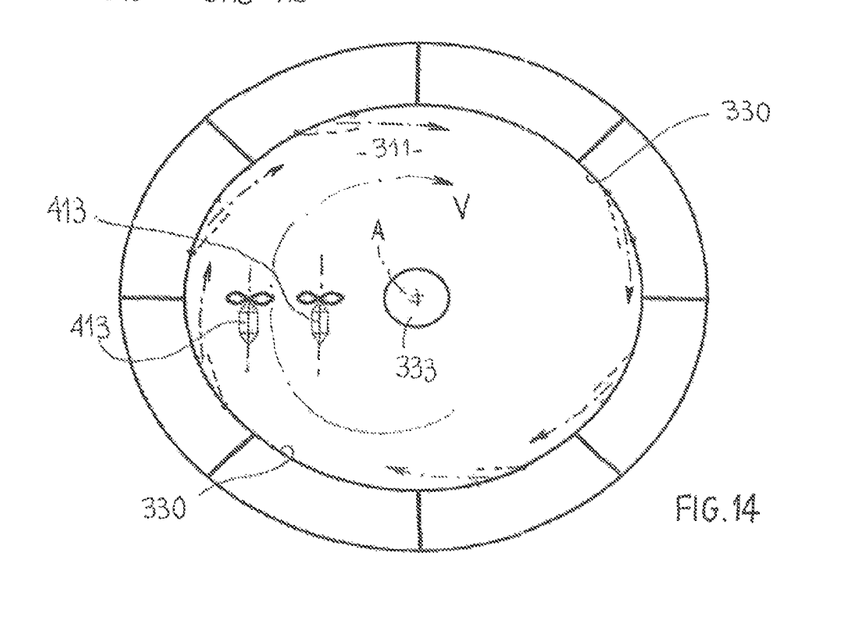

A further solution is that the throttling channel 318 (or each flow passage of this channel, if it is made of a plurality of sub-channels as in FIG. 13) is adjusted intrinsically, for example like a flexible and elastic membrane wherein the opening, or flow passage of the liquid to the lower portion (such as 311b) from the central compartment (such as 311) is deformed elastically as a function of the flow rate and the pressure applied thereon.

Although not shown above, it may be envisaged that the adjustable stopper 13,113,213,333 and/or, on the intermediate channel, the channel 18,118 . . . 318 is/are situated away from the axis of rotation of the first turbine 313.

It is thus possible to expect finer control of some oscillation motion, when for example there may be an imbalance between the levels for switching from one direction to another.

Note should be taken that a discharge, via the abovementioned throttling channel, offset in relation to the vertical axis of the Vortex would create a rotational motion of the water mass (the water would rotate at the same time, the flow is uniform). On the other hand, the discharge centred as illustrated, creates a rotational motion (the water mass rotates on itself). The liquid particles have, radially to the axis A, different velocities in relation to each other.

In this way, in these figures, by way of comparison to FIG. 12, on a plurality, in this case two, of submerged turbines 413, of the marine turbine type, are found in the current of the vortex V created by the means mentioned above detected using the identical views between FIGS. 12 and 13 (thus apart from the turbines 313 and 413).

The turbines 413 of the central compartment are coupled with an AC generator. Furthermore, they are oriented, with the vessel 401 at rest (thus axis A vertical), substantially horizontal, and above all at two different radial distances from the central axis A, whereas the throttling channel 318 is centred along this axis A. These turbines will thus see the flow of liquid particles actuated by the same rotational motion, but having different velocities in relation to each other.

In the above, it should be clear that the term "channel" used should not be limited to a conduit or line. As shown in particular in FIGS. 6,10, 12,13, it may be limited to a mere reduced cross-section created in a thin wall. It is qualified by a throttled section or liquid flow diaphragm.

It should further be noted that, in respect of the adjustable stopper (13, 113, 213, 333), it is recommended:

in the case of (at least) one secondary turbine (13,113,213), to vary the head of this secondary turbine to optimise, above, the level of liquid available for the main turbine, and/or in the case of a movable-wall diaphragm (333), to adapt the opening and closing of the stopper, here again to optimise, above, the level of liquid available for the main turbine.

By increasing the head of the secondary turbine and/or closing the movable walls, the cross-section of the diaphragm 18,118 . . . will be limited and it will thus be possible to raise the level of liquid in the upper portion 11a, 111a . . . . In this way, regular operation and output will be favoured.

Figure 15:
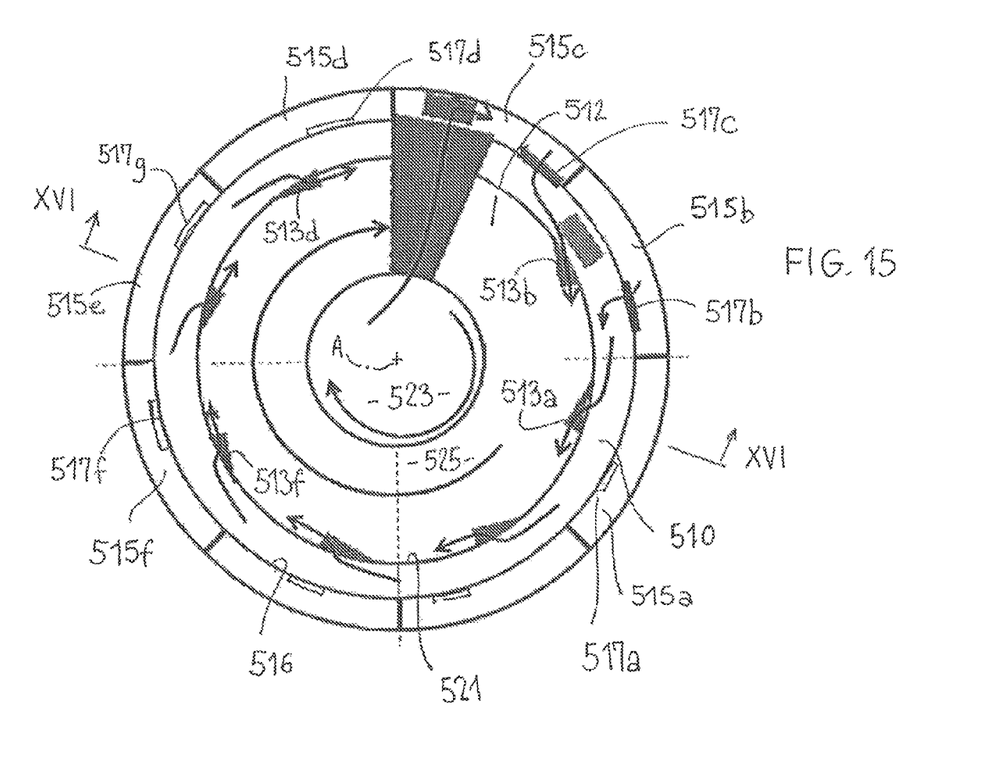
FIGS. 15,16 represent schematically, in horizontal and vertical sections (section XVI-XVI), a solution having intermediate buffer compartment(s), which may be (each in the event of a plurality being stacked) similar to a water distribution torus.
Figure 16:
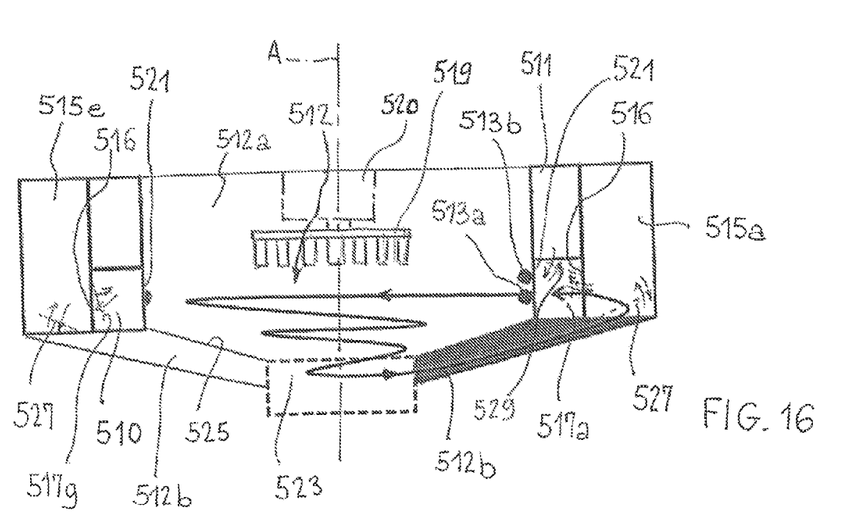

With reference to FIGS. 15 and 16, a solution favouring turbine output further, and intended to switch from a discontinuous liquid supply into the compartment where the turbine(s) is/are situated, at a few points, with variable water level differences, to a quasi-continuous liquid supply, at maximum pressure at the time t, at all supply points, simultaneously or quasi-simultaneously, will now be described.

For this, it is proposed that the device further comprises at least one intermediate chamber 510,511 for distributing the transferred liquid, positioned between:

the central compartment 512, with which this intermediate chamber is connected via a plurality of passages or openings 513a,513b, . . . 513f which may be concomitantly open, for transferring liquid, and at least some of the peripheral compartments 515a, 515b, . . . 515f, from which said intermediate chamber is separated by the side wall 516 and connected with a plurality whereof via at least one of the valve systems 517a,517b, . . . 517f which may also be concomitantly be open for those supplying the intermediate chamber with liquid (see 517b, 517c FIG. 15) at the time in question, while the device is inclined/oscillating.

In this way, from the main, central, axis A outwards, the following are arranged successively, and in the example concentrically: the central compartment 512, the intermediate chamber(s) 510,511, the peripheral compartments 515a, 515b, . . . 515f. As above, these peripheral compartments thus define ballasts.

The intermediate chambers 510,511 are stacked. The upper chamber 511 may be connected with that 510 below via flaps 529, preferably controlled for opening and closing.

To be as efficient as possible in the supply to the central compartment 512 and thus maintaining the vortex and the rotation with the turbine 519 coupled with the AC generator 520 (FIG. 16), it is recommended that the (each) intermediate chamber 510,511 is closed onto itself about the central compartment and can be connected to all the valve systems and/or all the openings or passages 513a,513b, . . . 513f mentioned above.

These openings or passages may consist of continuously open tubes, through the inner side wall 521 separating the intermediate chamber 510,511 from the central compartment 512 and each inclined to favour the vortex as mentioned above and illustrated in FIG. 15 (substantially tangential supply).

The valve systems 517a,517b, . . . 517f may consist of non-return valves ensuring a liquid flow only in one direction (see FIG. 16). They may be non-controlled, thus be opened and/or closed under the sole action of the liquid flowing between the ballasts in question and the intermediate chamber 510.

According to one embodiment, the (each) chamber intermediate chamber (that could be referred to as the pressurised water injection torus) will have a vertical succession of levels.

These levels are, optionally, interconnected via non-return valves, such as 529. Further solution: duplicating the "torus" structure 510, with a plurality stacked intermediate chambers identical to that 510, with the valve systems 517a,517b, . . . thereof and the openings or passages 513a,513b, . . . thereof (thus typically defining substantially tangential water injectors). According to the water level in the peripheral ballasts 515a, . . . , the water could move to the level 510 or to the levels 510 and 511.

In FIGS. 15,16, the intermediate chamber 510 is presented in the form of a buffer vessel between the upstream ballasts (in the example 515b,515c) and the central compartment or tank 512. In this configuration, the valve systems 517a, 517b, . . . and the injectors (105) are uncoupled: once there is a liquid head level (during switching as in FIG. 16), the pressure opens the valve system(s) 517a,517b, . . . , in question and the liquid flows via the intermediate chamber 510 where it is distributed such that it flows into the central compartment via at least one, and in principle a plurality, of the openings or passages 513a,513b, . . . 513f, as illustrated. Having arrived at the bottom throttling zone 523 formed in the intermediate transverse wall 525 separating the respectively upper 512a and lower 512b portions of the central compartment.

Note should be taken that the lower portion 512b (may) extend(s) to the peripheral beyond the vertical of the partition 521 of the central compartment, and as in this case to below the intermediate chamber 510 and the peripheral compartments such as 515a,515e.

In the embodiment in FIGS. 15,16, effective in terms of liquid flow, a series of non-return valves 527 is arranged between the portion 525 and each of the peripheral compartments 515a,515b, . . . 515f.

Each non-return valve 527 may open to allow the liquid having arrived in the portion 525 to flow from this portion to the peripheral compartments in question, at a time t of the current motion, and close to prevent flow in the opposite direction.

The non-return valves 527 could be controlled to open and close.

On the basis of FIGS. 15,16, it is thus understood that, during oscillations of the device, liquid, to flow (always in a closed circuit) from a plurality of the peripheral compartments to the central compartment:

will flow via the intermediate chamber(s), such as 510 or 511 and 510, making it possible to collect the liquid from these various peripheral compartments thereof, and will then flow from this intermediate chamber to the central compartment via the, or a plurality of the, passages 513a, 513b, . . . open in the intermediate chamber.

In this way, regardless of the motion of the device/vessel, at the time t and in absolute terms, the level of liquid in at least one of the upstream ballasts is higher than that of the other upstream ballasts. The intermediate chamber, still containing the flowing liquid, is in contact via the non-return valves 517a,517b, . . . with preferably all the upstream ballasts, and thus at the time t at the pressure of the highest ballast. The conception of the system overall means that there is continuously an upstream ballast wherein the liquid level is equal to or greater than that of the central tank/compartment 512. In the case in question, the intermediate chamber is thus at a "positive pressure" in relation to the central tank/compartment. In FIG. 16, the valve 517a is then opened and the flow occurs naturally via a large number, or all, of the passages 513a,513b, . . . at the same time, hence an effective performance of the flow at the time t, since the injection in the central tank/compartment 510 is "multi-point". At the time t+Δt, the ballast 515c in FIG. 15 has partially emptied, the motion has continued and generates a higher maximum absolute water level in a further ballast (adjacent compartment, 515b for example). The valve 517c is then closed, while the adjacent valve 517b opens, setting the intermediate chamber 510 at the pressure of the ballast 515b in the example and the flow continues via a large number, or all, of the passages 513a,513b, . . . .

Consequently, the device in question will act both as a flotation support for all the functions described hereinafter and as temporary energy storage (in the intermediate chamber(s) 510,511) in the form of a water volume (101) situated in elevation in relation to the kinetic energy tank (central compartment 510).

Note should be taken that, in the above solution, the ballasts/peripheral compartments such as 515a . . . 515e . . . will not operate by single pair between an upstream ballast/a downstream ballast.

It should also be noted that, according to a further aspect of the invention associated with seeking a quasi-continuous liquid supply in the compartment where the turbine(s) is/are situated (central tank/compartment in the examples above), preferably at the maximum pressure at the time t, at all supply points, simultaneously or quasi-simultaneously, the following solutions are considered to be innovative, per se:

a device for recovering motion energy in the form of electrical energy, the device comprising:
a vessel:
comprising a plurality of peripheral compartments (515a . . . 515e . . . ) and a central compartment (512) positioned between first and second compartments of said peripheral compartments,
having a vertical main axis (A) at rest, and at least one side wall (516) positioned between a plurality of the peripheral compartments and the central compartment,
suitable for oscillating about at least one axis perpendicular to said main axis under the effect of said motion, and
containing a liquid (F) which, when the vessel oscillates, flows between the first and second compartments (515a . . . 515e . . . ) via the central compartment,
a plurality of valve systems (517a,517b, . . . ) arranged at the location of said side wall and each situated for transferring liquid from one of the peripheral compartments to the upper portion of the central compartment and from the lower portion of the central compartment to at least one other of said peripheral compartments, when the vessel is inclined, the central compartment comprising an upper portion (512a) and a lower portion (512b) separated by an intermediate partition (525) provided with a throttling zone for the flow of the liquid from the upper portion to the lower portion,
at least one first turbine (519) coupled with an AC generator and arranged in the central compartment, and
at least one intermediate chamber (510,511) for distributing the transferred liquid, positioned between:
the central compartment, with which it is connected via a plurality of openings (513a . . . ) which may be concomitantly open, for transferring liquid, and
at least some of the peripheral compartments, from which the intermediate chamber is separated by said side wall (516) and connected with a plurality whereof via at least some of the valve systems (517a,517b, . . . ) which may also be concomitantly be open for those supplying the intermediate chamber with liquid.

It is recommended that the intermediate chamber is closed onto itself about the central compartment and can be connected to all the valve systems and/or all the openings.

The invention also relates to a method for recovering, in the form of electrical energy, oscillation motion energy, the method comprising steps wherein:
a vessel containing a liquid (F) is provided with a plurality of peripheral compartments (515a . . . 515e . . . ) and a central compartment (512)
positioned between first and second compartments of said peripheral compartments:
where at least one turbine (519) coupled with an AC generator is arranged,
between an upper portion and a lower portion whereof an intermediate partition (525) is positioned, provided with a channel (523) forming a throttling zone for the flow of liquid from the upper portion to the lower portion,
having at least one side wall (516) where valve systems (517a . . . ) are arranged,
under the effect of said motion, the vessel is oscillated such that, during the oscillations, some of said valves, situated at a higher elevation level than the other valves, move liquid from a portion of the peripheral compartments to the upper portion of the central compartment, others of said valves moving liquid from the lower portion of the central compartment to other peripheral compartments, the liquid (F) then flowing via the central compartment where a turbine (519) is then lead in rotation,
characterised by flowing liquid intended to move from a plurality of the peripheral compartments to the central compartment via at least one intermediate chamber (510,511) collecting the liquid from these various peripheral compartments, and said liquid is then moved from this intermediate chamber to the central compartment via a plurality of passages open in the intermediate chamber.

It is further recommended that, in the upper portion of the central compartment or tank (512), a rotational motion of the liquid is created such that the particles of this liquid have different velocities in relation to each other, at different radial distances in relation to a central axis (A) of the vessel, vertical at rest.

The invention claimed is:
1. A device for recovering motion energy in the form of electrical energy comprising:
a vessel with a plurality of peripheral compartments and a central compartment positioned between first and second compartments of the peripheral compartments, and having a vertical main axis (A) at rest and at least one side wall positioned between a plurality of the peripheral compartments and the central compartment, suitable for oscillating about at least one axis perpendicular to the main axis under the effect of the motion, the vessel containing a liquid (F) which, when the vessel oscillates, flows between the first and second compartments via the central compartment
a plurality of valve systems arranged at the location of the side wall with each situated for transferring liquid from one of the peripheral compartments to the upper portion of the central compartment and from the lower portion of the central compartment to at least one other of the peripheral compartments, when the vessel is inclined, the central compartment comprising an upper portion and a lower portion separated by an intermediate partition provided with a channel forming a throttling zone for the flow of the liquid from the upper portion to the lower portion, and substantially at the level where an adjustable stopper is arranged; and, at least one first turbine coupled with an AC generator and arranged in the upper portion of the central compartment, wherein the adjustable stopper comprises a secondary turbine.

2. The device according to claim 1, wherein the adjustable stopper comprises a diaphragm.

3. The device according to claim 2, wherein, on the intermediate partition, the channel is situated away from the axis of rotation of the first turbine.

4. The device according to claim 3, wherein the adjustable stopper is situated away from the axis of rotation of the first turbine.

5. The device according to claim 4 further comprising at least one intermediate chamber for distributing the transferred liquid and positioned between the central compartment with which it is connected via a plurality of openings which may be concomitantly open, for transferring liquid, and at least some of the peripheral compartments, from which the intermediate chamber is separated by the side wall and connected with a plurality whereof via at least some of the valve systems which may also be concomitantly be open for those supplying the intermediate chamber with liquid.

6. The device according to claim 5, wherein the intermediate chamber is closed onto itself about the central compartment and can be connected to all the valve systems and/or all the openings.

7. A method for recovering, in the form of electrical energy, oscillation motion energy comprising:
   a. a vessel containing
      a liquid (F),
      a central compartment positioned between first and second compartments;
      an intermediate partition positioned between an upper portion and a lower portion and provided with a channel forming a throttling zone for the flow of liquid from the upper portion to the lower portion,
      at least one first turbine coupled with an AC generator is arranged in the upper portion,
      the central compartment having at least one side wall, wherein first and second valve systems are arranged such that some of the valves, situated, at rest, at a higher level of elevation than the other valves, move, during the oscillations, liquid from the first and second compartments to the upper portion of the central compartment, the further valves then moving liquid from the lower portion of the central compartment to the first and second compartments,
   b. under the effect of the motion, the vessel is oscillated about at least one axis perpendicular to a main axis (A) of the vessel, vertical at rest, the liquid (F) then flowing between the first and second compartments, via the central compartment:
      where it rotates the first turbine,
      and in the upper portion a rotational motion of the liquid is created such that the particles of this liquid have different velocities in relation to each other, at different radial differences with respect to a central axis (A) of the vessel, vertical at rest.

8. The method according to claim 7, wherein:
   by a control loop, at least the valves moving liquid from first and second compartments to the upper portion of the central compartment are controlled in respect of opening/closing and/or flow rate,
   and/or the valves are provided with flaps directing, in the open position, the liquid flow so as to inject the flow into the central compartment with a velocity tangential to the corresponding side wall of the central compartment, with an angle α with respect to the normal N to the side wall of at least 45°.

9. The method according to claim 8, wherein substantially at the throttling channel, an adjustable stopper comprising a secondary turbine is arranged, and the head of the secondary turbine is varied to optimize, above, the level of liquid available for the main turbine.

10. The method according to claim 9, wherein substantially at the throttling channel an adjustable stopper comprising a movable-wall diaphragm is arranged, and the opening and closing of the stopper are adapted to optimise, above, the level of liquid available for the main turbine.

11. The method according to claim 10 wherein liquid intended to flow from a plurality of peripheral compartments to the central compartment flows via at least one intermediate chamber collecting the liquid from these various peripheral compartments, and the liquid is then moved from this intermediate chamber to the central compartment via a plurality of passages open in the intermediate chamber.

* * * * *